March 31, 1970 P. OPPRECHT ET AL 3,504,155
SEMIAUTOMATIC WELDING MACHINE
Filed Sept. 8, 1967
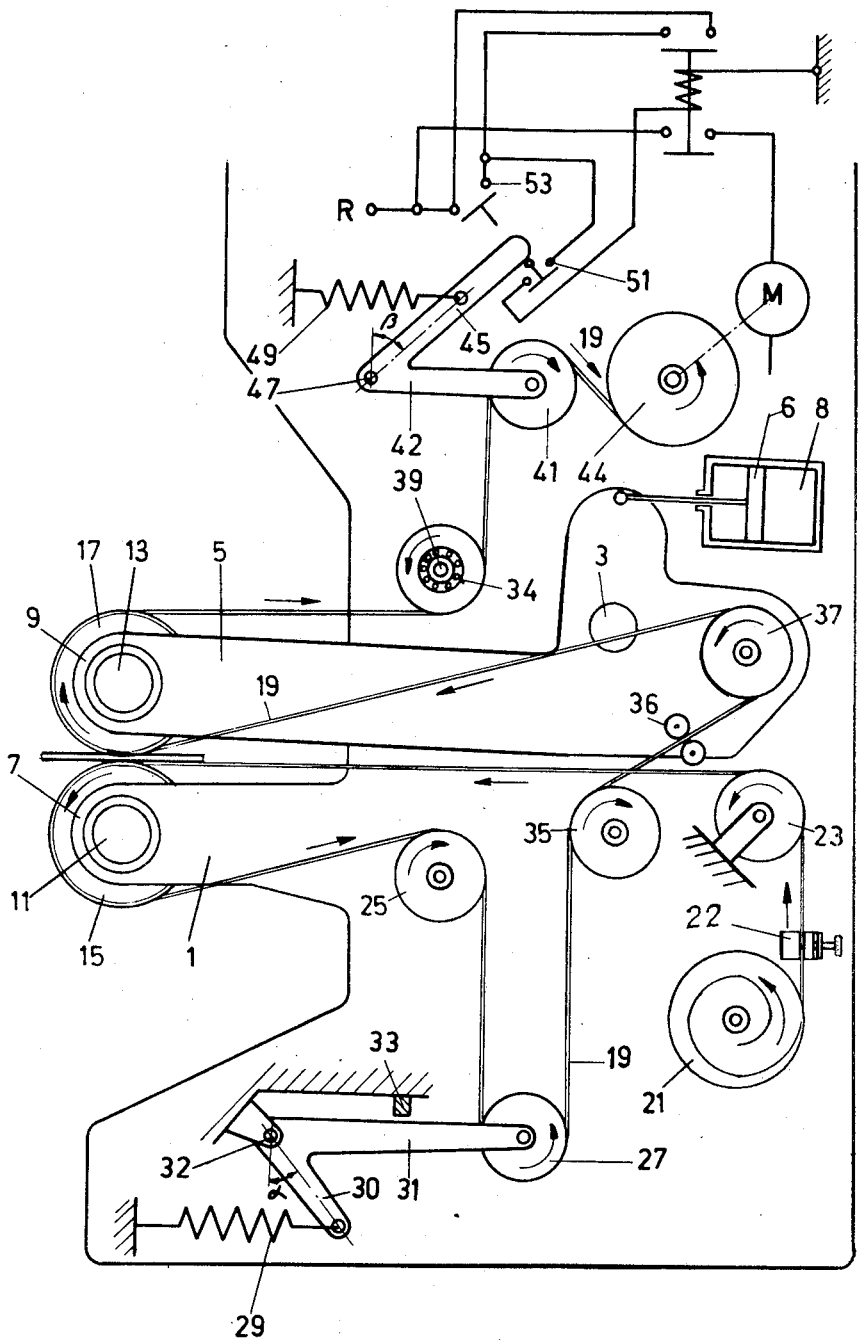
INVENTORS
Paul Opprecht
Hans Byland
BY Michael S. Striker
ATTORNEY United States Patent Office 3,504,155
Patented Mar. 31, 1970

3,504,155
SEMIAUTOMATIC WELDING MACHINE
Paul Opprecht, Im hintern Bernold, and Hans Byland,
Bernold 252, both of Bergdietikon, Switzerland
Filed Sept. 8, 1967, Ser. No. 666,271
Claims priority, application Switzerland, Sept. 12, 1966,
13,151/66
Int. Cl. B23k 11/06
U.S. Cl. 219—81                                8 Claims

ABSTRACT OF THE DISCLOSURE

In a welding machine for welding tinned or galvanized sheet metal, a wire-shaped and driven electrode is passed over two adjacent movable rolls between which the sheet metal is introduced in contact with the wire-shaped electrode. In order to control loops formed in the wire-shaped electrode during welding, several spring-loaded wire tensioners and two feed devices coupled one to the other, one of them comprising a free-wheel clutch, are provided.

Background of the invention

There are known welding machines for welding tinned or galvanized sheet metal with electrodes which consist in a single, continuous, conductive wire. The wire-shaped electrode is passed round a first of two electrode rolls and then round the other. The sheet metal to be welded is introduced between both rolls in spot-like contact with both electrodes passed round the rolls.

Practical tests have shown, however, that it is not possible in this simple manner to provide a semi-automatic or even fully automatic welding machine capable of satisfactorily welding up sheet-metal components. It is found that the wire-shaped electrode is stretched after the first pass through the welding point, so that between the first and the second pass through the welding point, at which both electrode wire portions must have the same speed if a faultless weld is to be ensured, the continual stretching gives rise to a loop which, without additional means, makes the performance of a welding process on such a welding machine practically impossible.

It is the object of the present invention to eliminate this drawback.

Summary of the invention

According to the invention, a semi-automatic welding machine for welding sheet metal comprises wire-shaped electrodes of a single, continuous wire, means for mechanically driving said wire-shaped electrodes, a pair of adjacent electrode rolls on which the wire-shaped electrodes rest in laminar fashion and between which the sheet metal is introduced for welding, means for actuating the electrode rolls to have the wire-shaped electrodes rest in spot-like contact on each of the surfaces of the sheet metal. The welding machine further comprises means for the purpose of taking up loops of the wire-shaped electrodes during welding, and pulling along one of said loops when the electrode rolls are relieved from the sheet metal, said further means being arranged after the first electrode roll and before the second electrode roll, and also after the second electrode roll in the direction of movement of the wire-shaped electrodes.

Brief description of drawing

A preferred embodiment of the invention is described below with reference to a drawing, showing a diagrammatic view from the operator's position of the right-hand side of the top of a welding machine serving for the semiautomatic welding of tinned or galvanized sheet iron or sheet aluminum.

Detailed description

Referring to the drawing the machine presents a fixed arm 1 and an arm 5 pivoting on an axis 3. The said arm 5 is pneumatically or hydraulically operated by a piston 6 arranged in a cylinder 8. It can be swung mechanically, as by a spring, for instance. Rolls 15 and 17, designed as electrodes, are rotatably mounted by means of pins 11 and 13 at the ends 7 and 9 of the arms 1 and 5. The rolls 15 and 17 are profiled. A current-conducting continuous wire 19, taken off from a reel 21, passes through a wire brake 22 and round a guide roll 23 to the electrode roll 15, is laid into the groove of the latter and, after being taken round through 180°, is passed to a feed roll 25 and thence round a tension roll 27 mounted on a lever 31 loaded by a spring 29. The movement of lever 31 is limited in one direction by a stop 33, adjustable if necessary. The said lever is a double-arm lever pivoted at point 32. The arrangement is such that the tension moment acting on the tension roll 27 is practically constant, over the whole pivoting range and is equal to the product of spring tension times length of lever arm 30 times cos $\alpha$.

The electrode wire 19 subsequently passes round two guide rolls 35 and 37 and is then laid into the groove of the second electrode roll 17. The electrode wire is then passed round a second feed roll 39. From the roll 39 the wire 19 passes round a spring-loaded guide and stretch roll 41 to the take-up reel 44. In this manner the electrode wire 19 can serve both electrode rolls 15 and 17 in a single pass. The guide and stretch roll 41 is mounted on a double-arm lever 42 pivoted at point 47. This lever is under the action of a spring 49. Here again, the arrangement is such that the tension moment acting on the tension and stretch roll 41 is practically constant over the whole pivoting range and is equal to the product of spring tension times length of lever arm 45 times cos $\beta$. Assuming, for instance, that the arms 30 and 45 are equally long, the ratio between the spring rates of springs 29 and 49 is approximately 1:2. This means that the wire pull due to the lever 42 is about double that of the lever 31. The pivoting range of the lever 42 is limited by an opening limit switch 51 at one end and an analogous closing limit switch 53 at the other.

The shafts of the two feed rolls 25 and 39 are rigidly interconnected. But while the roll 25 is fixed to its shaft, the roll 39 is connected with its shaft by a free-wheel or overrunning clutch 34 in the forward direction of rotation. The effect of this connection is that at the start of the welding operation the two feed rolls 25 and 39 start running at the same time and speed up equally.

When the semi-automatic welding machine starts running and the sheet stock is inserted between the electrode rolls 15 and 17, which are then pressed together for welding, the pressure on the electrode wire 19 at the welding point, i.e. the point of contact between the two wire loops round the electrode rolls 15 and 17, will cause the wire to stretch. As the wire speed $v_1$ of the two wire loops at the welding point must be exactly the same, the slack of the wire 19 between electrode roll 15 and electrode roll 17 grows longer. During welding, the lengthening of the wire loop between these two rolls is taken up by the tension roll 27, which, as mentioned, exerts a constant pull on the electrode wire 19 over its whole pivoting range and thus keeps the loop taut. Another loop forms after the electrode roll 17 and is taken up during the welding operation by the tension roll 41.

While the peripheral speed of the two rolls 15 and 17 is equal to the wire feed speed $v_1$ from the reel 21, the peripheral or feed speed of the two feed rolls 25 and 39 corresponds to the speed $v_1+v_2$ of the stretched wire, where $v_1$ is greater than $v_2$.

At the start of welding, the lever 31 rests against the stop 33. The lever 42 is in some position between the closing limit switch 53 and the opening limit switch 51, in the extreme case in the position shown in the drawing. The length of the loop round the tension roll 27 is minimal. Assume the motor M running. The take-up speed of the reel 44 is greater than the approach speed of the wire 19, i.e. greater than $v_1+v_2$, where $v_1$ is the take-off speed of the wire 19 from the reel 21, which must be equal to the wire speed at the welding point, and $v_2$ is the speed due to the stretch. While the lower loop round the tension roll 27 merely has to take up the difference in length between the stretched and the unstretched wire, so that the lever 31 only swings slowly during the welding operation, the loop round the roll 41, with the motor M at standstill, grows according to the take-off speed $v_1+v_2$ of the feed roll 39, so that the lever 42 moves anticlockwise at a substantially higher peripheral speed than the lever 31 does clockwise.

The take-up speed of the reel 44 is invariably greater than the speed $v_1+v_2$ of the wire coming from the feed reel 39, so that, with motor M running, the lever 42 swings clockwise, reducing the loop round the roll 41, until it trips the opening limit switch 51 and thus breaks the circuit of the motor M or the motor contactor. Then the lever 42 swings anticlockwise, enlarging the loop, until it trips the closing limit switch 53 and thereby starts the motor M. Then the lever swings clockwise again. As the switch 53 is equipped with a holding relay, as shown in the drawing, the circuit will not be opened again and the motor M will wind the wire on to the reel 44 until the lever 42 reaches the extreme position shown and trips the opening limit switch 51. At the end of a welding operation, i.e. when the upper welding roll 17 has been lifted off the lower one 15, the loop held taut by the tension roll 27 during the welding operation will be pulled along by the swing of the lever 42, which exerts a pull on the wire 19 that is substantially greater than, e.g. double as large as, the pull exerted by the tension lever 31, until the lever 31 comes up against the stop 33. During the process, the feed roll 25 and the shaft of the roll 39 stand still, while the feed roll 39, owing to the free-wheel clutch 34, follows freely on its shaft when the wire 19 is being pulled along. This process is made possible by the facility of pulling the wire taut by means of the lever 42, and also by the provision of the free-wheel clutch 34. Owing to the free-wheel clutch 34, the two rolls 25 and 39 are driven by a single drive unit while still the roll 39 can turn freely when the wire is pulled taut.

The pulling taut of the slacks of the electrode wire is performed in the time needed to remove the welded component and insert a new component into the holding device of the welding machine.

It has been found that as soon as the electrode rolls 15 and 17 close up and the welding pressure rises, the wire 19 is deformed as in a rolling process, i.e. it increases in width and length. If such a deformed transitional portion runs through the welding point during welding in the second pass, the weld will present an irregularity due to the short small constriction of the welding wire. This will naturally impair the uniformity and dependability of the weld, so that these portions of the welding wire 19 must be smoothed before passing the welding point.

One way of preventing the suddenly occurring short constriction of the welding wire 19 caused by the action of welding rolls 17 and 15 during the first wire pass, is to provide the pivoting arm with suitable cushioning means to ensure gentle touch-down of the electrode roll 17 on the welding stock. This prevents a sudden drop in thickness in the deformation of the welding wire 19.

It has further been found that in the welding of strongly curved sheet-metal frames of the round components to be welded up, notably can bodies, the resting surface of the inner and the outer electrode wire 19 differs in size, as in one case a concave frame surface lies opposite a convex wire profile, while in the other case both the frame and the wire are convex and therefore present a smaller contact surface than in the former case. This fact also impairs the quality of the welds.

To eliminate this drawback, a pair of rollers 36 is arranged before the guide roll 37, positioned immediately before the upper electrode roll 17, and the said pair of rollers impresses the wire 19 with a concave shape, for instance, corresponding to the frame surface, with the object of forming an optimum contact surface with the associated frame at the welding point. Particularly in the welding of galvanized sheet metal, which usually presents major thicknesses and also requires higher amperage, this device presents great advantages.

Further, with a view to simplifying machine design, it has been found convenient to operate the feed of the welding stock, notably the sheet bodies for can production, by means of the moving electrode wire 19 and thus dispense with special chains and other driving devices. This is done by the movement of the wire 19, which is pulled over taper rollers of the feed rolls 25 and 39.

Thus it is possible to construct a semi-automatic welding machine with a single wire electrode which meets the requirements specified and ensures optimum use of the electrode and which, with the exception of the additional stretch length after the first pass through the welding point, permits double use to be made of the electrode wire as compared with the known systems of welding machines.

We claim:
1. A resistance welding machine for welding sheet metal comprising a pair of adjacent electrode rolls; wire-shaped electrodes in form of a single continuous wire; means guilding said wire over one of said electrode rolls and in a loop from said one over the other of said electrode rolls; means for moving said pair of electrode rolls between an inactive spaced-apart position and an active welding position in which the wire guided over the rolls will contact opposite surfaces of sheet metal introduced for welding between the rolls; and further means for taking up the slack which is formed in the wire loop by stretching the wire as it passes between the one electrode roll and the metal sheet during the welding operation and for collecting the slack when said electrode rolls are in said inactive position, said further means being arranged downstream of said one and upstream of said other electrode roll and also downstream of the latter.

2. The welding machine of claim 1, wherein the means for mechanically driving the wire comprise a first feed device arranged between the electrode rolls, and a second feed device arranged after the second electrode roll, said second feed device being rigidly coupled with said first feed device, and being provided with a free-wheel clutch for the purpose of overrunning.

3. The welding machine of claim 1, wherein said further means each comprise a spring-loaded wire tensioner.

4. The welding machine of claim 3, wherein each wire tensioner has the form of a lever and is provided with a spring, the wire tensioner being so designed and arranged that the stretching force of the wire tensioner acting on the wire is at least approximately constant over the whole lever swing range.

5. The welding machine of claim 3, wherein the torque on the wire tensioner arranged after the second electrode roll is greater than that on the other wire tensioner, e.g. double as great.

6. The welding machine of claim 3, wherein at least the home position of one of the wire tensioners is fixed by a stop.

7. The welding machine of claim 4, wherein for at least one wire tensioner there are arranged two limit switches which are tripped by the lever in its end positions.

8. A resistance welding machine for welding sheet metal, comprising two electrode rolls; wire-shaped electrodes in the form of a single continuous loop; means for guilding said wire in succession over said rolls and in a loop between said rolls; means for moving said rolls between an inactive spaced-apart position and a proximate welding position in which, in use, sheet metal to be welded is passed between opposite wire portions guided over said rolls; means for taking up the slack which is formed in said wire loop by stretching the wire as it passes between the first electrode roll and the metal sheet during the welding operation; and means for collecting the slack when the electrode rolls are in said inactive position.

References Cited

UNITED STATES PATENTS

| | | | |
|---|---|---|---|
| 1,300,603 | 4/1919 | Gravell | 219—81 |
| 1,308,778 | 7/1919 | Gravell | 219—82 |
| 3,015,713 | 1/1962 | Eckler et al. | 219—81 X |
| 3,102,945 | 9/1963 | Opprecht | 219—81 |

JOSEPH V. TRUHE, Primary Examiner

W. D. BROOKS, Assistant Examiner